United States Patent [19]

Shu

[11] 4,420,008
[45] Dec. 13, 1983

[54] METHOD FOR TRANSPORTING VISCOUS CRUDE OILS

[75] Inventor: Winston R. Shu, Dallas, Tex.

[73] Assignee: Mobil Oil Corporation, New York, N.Y.

[21] Appl. No.: 344,095

[22] Filed: Jan. 29, 1982

[51] Int. Cl.³ ............................ F17D 1/16; F17D 1/17
[52] U.S. Cl. ........................................ 137/4; 137/13; 137/92
[58] Field of Search ............... 137/4, 13, 92, 3, 101.9, 137/111, 114; 48/180, 190

[56] References Cited

U.S. PATENT DOCUMENTS

| | | | |
|---|---|---|---|
| 3,870,063 | 3/1975 | Hayward | 137/13 |
| 4,054,408 | 10/1977 | Sheffield et al. | 431/12 |
| 4,243,493 | 1/1981 | Gruber et al. | 203/66 |
| 4,277,254 | 7/1981 | Hanson | 48/180 |
| 4,391,701 | 7/1983 | Le Page et al. | 208/370 |

*Primary Examiner*—Martin P. Schwadron
*Assistant Examiner*—J. Starsiak
*Attorney, Agent, or Firm*—Alexander J. McKillop; James F. Powers, Jr.; Lawrence O. Miller

[57] ABSTRACT

Viscous crude oil is mixed with an oil diluent having a relatively low viscosity and the resulting mixture having a predetermined viscosity and flow rate is pumped in a pipeline to a point of use. The flow rates of the viscous crude oil and the diluent are controlled with the aid of a digital computer in response to signals representative of the viscosity and specific gravity of each component, the desired viscosity of the mixture and the flow rate of the mixture. The viscosity of the mixture is maintained substantially at the design viscosity of the pipeline at the operating temperature of the pipeline and the flow rate of the mixture is substantially equal to the design capacity of the pipeline.

6 Claims, 1 Drawing Figure

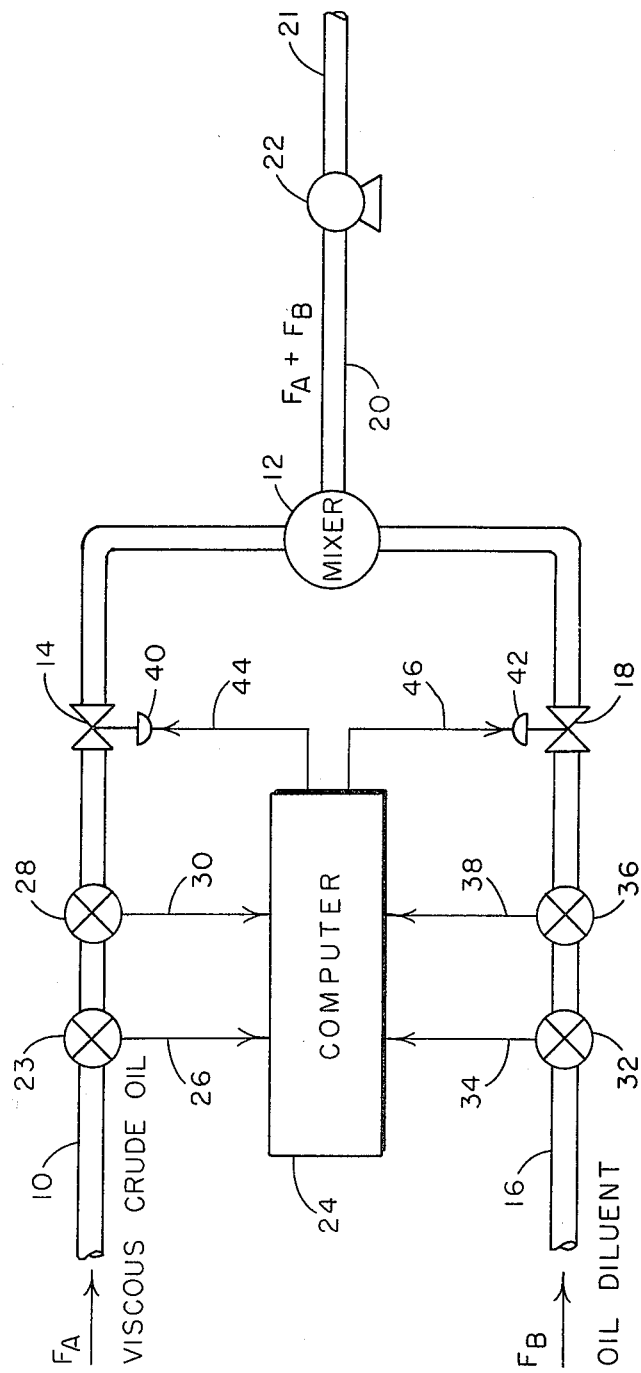

METHOD FOR TRANSPORTING VISCOUS CRUDE OILS

FIELD AND BACKGROUND OF THE INVENTION

1. Field of the Invention

This invention relates to transporting viscous crude oil wherein an oil diluent at a controlled flow rate is mixed with a viscous crude oil at a controlled flow rate to flow a mixture thereof having a predetermined viscosity and flow rate and pumping the mixture in a pipeline to a point of use.

2. Background of the Invention

As more and more heavy crudes are being produced the efficient, economic transportation of these crudes becomes increasingly important. Most common methods of transporting heavy crudes involve either heating or diluting the crude to a certain specified viscosity. The specified viscosity affects the design capacity and the economics of the pumping/pipeline systems which has been reported in the literature. See Sloan, A., Ingham, R., Mann, W. L., "Pipeline Transport of Heavy Oils," Report No. 76, First International Conference on The Future of Heavy Crude and Tar Sands, 1979.

The hot pipeline has its drawbacks primarily due to heat losses. In colder areas such as Canada, dilution appears to be more viable. The dilution technique is currently used to move heavy oils. See Moreau, B. L., "The Pipeline Transportation of Heavy Oils," J. Can. Pet. Tech. (Oct.-Dec., 1965) p. 252. However, the variation in the diluent properties and the ambient temperature will alter the diluent/crude mixing ratio. To maintain a smooth operation, it is essential to keep the viscosity of the mixture as close to design as possible.

In U.S. Pat. No. 3,804,752 to Merrill et al. a method for transporting crude oil is disclosed wherein the crude oil is first fractionated into at least two fractions, one fraction is congealed into spherical particles and then slurried with the other fraction and the slurry transported in a pipeline.

In U.S. Pat. No. 3,548,846 to Allen a method for transporting waxy crude oils by incorporating propane or butane with the crude oil is disclosed.

In U.S. Pat. No. 3,618,624 to Vairogs viscous crude oils are transported by incorporating a miscible gas, e.g. $CO_2$, methane, ether, etc. into the crude to reduce the viscosity of the viscous crude.

SUMMARY

The present invention relates to a method and system for transporting viscous crude oil in a pipeline wherein a stream of viscous crude oil at a controlled flow rate is mixed with a stream of oil diluent having a relatively low viscosity at a controlled flow rate and the resulting mixture having a predetermined viscosity and flow rate substantially equal to the design capacity of the pipeline is pumped through a pipeline to a point of use. The flow rates of the viscous crude oil and the oil diluent required to produce the desired mixture are constantly calculated by a digital computer using various equations in response to signals received by the computer representative of the viscosity and specific gravity of the viscous crude oil, viscosity and specific gravity of the oil diluent, desired viscosity of the mixture of viscous crude oil and oil diluent in the pipeline, and the desired flow rate of the mixture in the pipeline. Output signals representative of the calculated flow rates are generated by the computer and control means responsive to these signals control the flow rate of the viscous crude oil and the oil diluent to the desired values. The flow rate and viscosity of the mixture in the pipeline is maintained substantially equal to the design capacity of the pipeline at the operating temperature in the pipeline.

BRIEF DESCRIPTION OF THE DRAWING

The drawing is a schematic view of a system for transporting viscous crude oil in a pipeline wherein an oil diluent having a relatively low viscosity is mixed with a viscous crude oil under controlled conditions so that the resulting mixture will have a viscosity and total flow rate close to the design capacity of the pipeline.

DESCRIPTION OF THE PREFERRED EMBODIMENTS

With reference to the drawing, there is shown a first conduit 10 for delivering viscous crude oil at a flow rate $F_A$ from a source (not shown) to a mixer 12 through a first flow-varying means or control valve 14. A secnd conduit 16 delivers an oil diluent having a relatively low viscosity at a flow rate $F_B$ from a source (not shown) to the mixer 12 through a second flow-varying means or control valve 18. The mixer 12 may be a tank wherein the viscous crude oil and oil diluent are blended together or may contain means for mixing and blending the viscous crude oil with the oil diluent (not shown). Examples of such means includes liquid jets and and mechanical stirrers. A conduit 20 is shown leading from the mixer 12 and connecting with a pipeline 21. A pump 22 is located in the conduit 20 for pumping the viscous crude oil/oil diluent mixture having a flow rate of $F_A + F_B$ from mixer 12 to the pipeline 21 wherein the mixture is transported to a point of use. The pipeline 21 is designed to transport oil at a predetermined viscosity and at a predetermined flow rate.

The oil diluent used in the practice of this invention is a liquid hydrocarbon solvent miscible with the viscous crude oil and capable of reducing the viscosity of the crude oil to the design viscosity level of the pipeline system. For example, the oil diluent may be any economical solvent available in large quantities near the source of the viscous crude oil.

A viscosity sensing means 23 detects the viscosity of the viscous crude oil in first delivery line 10 and generates a signal representative of the viscosity of the viscous crude oil in delivery line 10. This signal is delivered to a computer 24 through a first input signal delivery line 26.

A specific gravity sensing means 28 detects the specific gravity of the viscous crude oil in first delivery line 10 and generates a signal representative of the density of the viscous crude oil in delivery line 10, which signal is delivered to the computer 24 through a second input signal delivery line 30.

A viscosity sensing means 32 detects the viscosity of the oil diluent in second delivery line 16 and generates a signal representative of the viscosity of the oil diluent in delivery line 16. This signal is delivered to the computer 24 through a third input signal delivery line 34.

A specific gravity sensing means 36 detects the specific gravity of the oil diluent in second delivery line 16, and develops a signal which is representative of the specific gravity of the oil diluent in delivery line 16, which signal is fed to the computer 24 through a four input signal delivery line 38.

If there is no variation in the properties of the oil diluent in delivery line 16, no specific gravity and viscosity sensing means is needed, however, signals representative of these physical parameters which will be known must be fed into the computer.

A first valve operator and signal-receiving means 40 is operably associated with the first flow-varying means or control valve 14.

A second valve operator and signal-receiving means 42 is operably associated with the second flow-varying means or control valve 18.

The flow rate of the viscous crude oil and the oil diluent are controlled to a desired value so that the mixture thereof has a predetermined viscosity at the temperature prevailing in the pipeline and a total flow rate corresponding to the design capacity of the pipeline. The method of calculating the flow rate of the viscous crude oil and the oil diluent to produce a mixture thereof having a desired viscosity and combined flow rate substantially equal to the design capacity of the pipeline is as follows:

$$\mu = \mu_A^{X_A} \mu_B^{X_B} \quad (1)$$

$$X_A = \frac{\alpha V_A}{V_A + V_B} \quad (2)$$

$$X_B = 1 - X_A \quad (3)$$

where, $\mu$ = mixture viscosity,
$\mu_A$ = viscosity of viscous crude oil,
$\mu_B$ = viscosity of oil diluent,
$V_A$ = volume fraction of viscous crude oil, and
$V_B$ = volume fraction of oil diluent.

The parameter $\alpha$ in Equation 2 is expressed as follows:

$$\alpha = \frac{17.04 \Delta \rho^{0.5237} \rho_A^{3.2745} \rho_B^{1.6316}}{\ln\left(\frac{\mu_A}{\mu_B}\right)} \quad (4)$$

where, $\rho_A$ = specific gravity viscous crude oil,
$\rho_B$ = specific gravity of oil diluent, and $\Delta_\rho = \rho_A - \rho_B$.

The ratio of the flow rates is based upon the expression:

$$\frac{F_A}{F_B} = \frac{V_A}{V_B} \quad (5)$$

where, $F_A$ = flow rate of viscous crude oil, and
$F_B$ = flow rate of oil diluent.

The relationship between the flow rates of the viscous crude oil, the oil diluent, and the flow rate of the mixture in the pipeline is specified by the expression:

$$F = F_A + F_B \quad (6)$$

where,

F = flow rate in pipeline.

Knowing that F must meet the designed capacity of the pipeline, equation (5) and (6) can be solved simultaneously to give $F_A$ and $F_B$. Thus, using the signals developed from the first, second, third and fourth input signal delivery lines which are fed to the computer along with signals representative of the desired viscosity of the viscous crude oil/oil diluent mixture ($\mu$) at the operating temperature in the pipeline and the desired designed flow rate capacity of the pipeline (F), the computer determines the desired flow rate of the viscous crude oil ($F_A$) and the desired flow rate of the oil diluent ($F_B$) in accordance with the equations described above and develops an output signal representative of each flow rate. The output signal representative of the viscous crude oil flow rate is fed through a first output delivery line 44 to the first signal-receiving means 40 to thereby operably control the position of the first flow-varying means 14 such that the flow rate of the viscous crude oil corresponds to the desired flow rate. The second output signal developed by the computer representative of the desired oil diluent flow rate is fed through a second output delivery line 46 to the second signal-receiving means 42 to thereby operably control the position of the second flow-varying means 18 such that the flow rate of the oil diluent corresponds to the desired flow rate. Therefore, the ratio of the viscous crude oil and oil diluent is maintained at a level corresponding to the design viscosity of the pipeline and the total flow rate of the mixture is substantially equal to the design-capacity of the pipeline 21.

EXAMPLE

Assume a situation where the pipeline 21 as shown in the drawing is designed to transport crude oil at 100 cp viscosity and 10,000 barrels per day at an operating temperature of 82° F. in the pipeline. Signals representative of these factors are fed into the computer. Viscous crude oil flows through line 10 and oil diluent flows through line 16. Assume that the signals developed from the first, second, third and fourth input signal delivery lines and fed into the computer are representative of a viscous crude oil having a 2,000,000 cp viscosity at 82° F., and a specific gravity of 1.04 at 82° F. and an oil diluent having a viscosity of 4.6 cp at 82° F. and a specific gravity of 0.827 at 82° F. Using these signals and the equations described above, computing means within the computer 24 determines that the desired ratio of viscous crude oil to oil diluent is 40/60 to produce a mixture having a viscosity of 100 cp at 82° F. and that for a pipeline capacity of 10,000 barrels per day the desired flow rate of the viscous crude oil is 4000 barrels per day and 6000 barrels per day for the oil diluent. The computer 24 develops an output signal representative of the desired viscous crude oil flow rate that is fed through line 44 to signal-receiving means 40 that operably controls the position of the control valve 14 so as to control the flow rate of the viscous crude oil at the desired value of 4,000 barrels per day. In addition, the computer 24 develops another output signal representative of the desired oil diluent flow rate that is fed through line 46 to signal-receiving means 42 that operably controls the position of the control valve 18 so as to control the flow rate of the diluent. Therefore, any variation in the properties of the viscous crude oil or the oil diluent are constantly monitored by the computer 24 and the flow rate of the two streams are constantly controlled prior to mixing so as to maintain a predetermined viscosity and flow rate of the mixture in the pipeline substantively equal to the design capacity of the pipeline.

From the foregoing specification one skilled in the art can readily ascertain the essential features of this invention and without departing from the spirit and scope thereof can adapt it to various diverse applications. It is my intention and desire that my invention be limited only by those restrictions or limitations as are contained in the claims appended immediately hereinafter below.

What is claimed is:

1. A method for transporting viscous crude oil in a pipeline, comprising:
   (a) providing a stream of viscous crude oil in a first conduit;
   (b) providing a stream of oil diluent having a relatively low viscosity in a second conduit;
   (c) mixing the stream of viscous crude oil with the stream of oil diluent to form a mixture thereof;
   (d) pumping said mixture through said pipeline at a desired viscosity and at a desired flow rate equal to the sum of the flow rate of the viscous crude oil and the oil diluent;
   (e) constantly measuring the viscosity and specific gravity of said viscous crude oil in said first conduit and producing signals repesentative of the viscosity and specific gravity of the viscous crude oil in said first conduit;
   (f) constantly measuring the viscosity and specific gravity of said oil diluent in said second conduit and producing signals representative of the viscosity and specific gravity of the oil diluent in said second conduit;
   (g) constantly providing a digital computer with said signals including signals representative of the desired viscosity of the mixture in the pipeline and the desired flow rate of the mixture in the pipeline;
   (h) constantly calculating in the computer, the flow rate of the viscous crude oil in said first conduit and the flow rate of the oil diluent in said second conduit in accordance with $$\mu = \mu_A{}^{X_A} \mu_B{}^{X_B} \quad (1)$$

$$X_A = \frac{\alpha V_A}{\alpha V_A + V_B} \quad (2)$$

$$X_B = 1 - X_A \quad (3)$$

$$\alpha = \frac{17.04 \Delta \rho^{0.5237} \rho_A{}^{3.2745} \rho_B{}^{1.6316}}{\ln\left(\frac{\mu_A}{\mu_B}\right)} \quad (4)$$

$$\Delta \rho = \rho_A - \rho_B \quad (5)$$

$$\frac{F_A}{F_B} = \frac{V_A}{V_B} \quad (6)$$

$$F = F_A + F_B \quad (7)$$

where
$\mu$ is the viscosity of the mixture,
$\mu_A$ is the viscosity of the viscous crude oil,
$\mu_B$ is the viscosity of the oil diluent,
$V_A$ is the volume fraction of viscous crude oil,
$V_B$ is the volume fraction of oil diluent,
$\rho_A$ is the specific gravity of the viscous crude oil,
$\rho_B$ is the specific gravity of the oil diluent,
$F_A$ is the flow rate of the viscous crude oil,
$F_B$ is the flow rate of the oil diluent, and F is the flow rate of the mixture;
   (i) constantly controlling the flow rate of the viscous crude oil in the first conduit to correspond to the resultant calculated flow rate determined by the computer during step (h); and
   (j) constantly controlling the flow rate of the oil diluent in the second conduit to correspond to the resultant calculated flow rate determined by the computer during step (h).

2. The method of claim 1 wherein the predetermined viscosity of the mixture is substantially equal to the design viscosity of the pipeline at the operating temperature of the pipeline and the predetermined flow rate of the mixture is substantially equal to the design capacity of the pipeline.

3. A method for transporting viscous crude oil in a pipeline, comprising:
   (a) providing a stream of viscous crude oil in a first conduit;
   (b) providing a stream of oil diluent having a predetermined relatively low viscosity and specific gravity;
   (c) mixing the stream of viscous crude oil with the stream of oil diluent to form a mixture thereof;
   (d) pumping said mixture through said pipeline at a desired viscosity and at a desired flow rate equal to the sum of the flow rate of the viscous crude oil and the oil diluent;
   (e) constantly measuring the viscosity and specific gravity of said viscous crude oil in said first conduit and producing signals representative of the viscosity and specific gravity of the viscous crude oil in said first conduit;
   (f) constantly providing a digital computer with said signals including signals representative of the viscosity and specific gravity of the oil diluent, the desired viscosity of the mixture in the pipeline, and the desired flow rate of the mixture in the pipeline;
   (g) constantly calculating in the computer, the flow rate of the viscous crude oil in said first conduit and the flow rate of the oil diluent in said second conduit in accordance with $$\mu = \mu_A{}^{X_A} \mu_B{}^{X_B} \quad (1)$$

$$X_A = \frac{\alpha V_A}{\alpha V_A + V_B} \quad (2)$$

$$X_B = 1 - X_A \quad (3)$$

$$\alpha = \frac{17.04 \Delta \rho^{0.5237} \rho_A{}^{3.2745} \rho_B{}^{1.6316}}{\ln\left(\frac{\mu_A}{\mu_B}\right)} \quad (4)$$

$$\Delta \rho = \rho_A - \rho_B \quad (5)$$

$$\frac{F_A}{F_B} = \frac{V_A}{V_B} \quad (6)$$

$$F = F_A + F_B \quad (7)$$

where
$\mu$ is the viscosity of the mixture,
$\mu_A$ is the viscosity of the viscous crude oil, $\mu_B$ is the viscosity of the oil diluent,
$V_A$ is the volume fraction of viscous crude oil,
$V_B$ is the volume fraction of oil diluent,
$\rho_A$ is the specific gravity of the viscous crude oil,
$\rho_B$ is the specific gravity of the oil diluent,
$F_A$ is the flow rate of the viscous crude oil,
$F_B$ is the flow rate of the oil diluent, and F is the flow rate of the mixture;
(h) constantly controlling the flow rate of the viscous crude oil in the first conduit to correspond to the resultant calculated flow rate determined by the computer during step (g); and
(i) constantly controlling the flow rate of the oil diluent in the second conduit to correspond to the resultant calculated flow rate determined by the computer during step (g).

4. The method of claim 3 wherein the predetermined viscosity of the mixture is substantially equal to the design viscosity of the pipeline at the operating temperature of the pipeline and the predetermined flow rate of the mixture is substantially equal to the design capacity of the pipeline.

5. A system for transporting viscous crude oil in a pipeline, comprising:
(a) a stream of viscous crude oil flowing in a first conduit;
(b) a stream of oil diluent having a relatively low viscosity flowing in a second conduit;
(c) means for mixing the stream of viscous crude oil in the first conduit withe the stream of oil diluent in the second conduit;
(d) means for introducing the resulting mixed streams of viscous crude oil and oil diluent from the mixing means into said pipeline for transportation to a point of use wherein the resultant flow rate in the pipeline is equal to the sum of the flow rate of said viscous crude oil in said first conduit and the flow rate of said oil diluent in said second conduit;
(e) a first flow-varying means operatively connected to said first conduit for controlling the rate of flow of said viscous crude oil through said first conduit;
(f) a second flow-varying means operatively connected to said second conduit for controlling the rate of flow of said oil diluent through said second conduit;
(g) viscosity sensing means operatively connected to said first conduit for developing a first signal representative of the viscosity of the viscous crude oil in said first conduit upstream of said first flow-varying means;
(h) specific gravity sensing means operatively connected to said first conduit for developing a second signal representative of the specific gravity of the viscous crude oil in said first conduit upstream of said first flow-varying means;
(i) viscosity sensing means operatively connected to said second conduit for developing a third signal representative of the viscosity of the oil diluent in said second conduit upstream of said second flow-varying means;
(j) specific gravity sensing means operatively connected to said second conduit for developing a fourth signal representative of the specific gravity of the oil diluent in said second conduit upstream of said second flow-varying means;
(k) computer means responsive to said first, second, third and fourth signals which calculate the desired flow rate of said viscous crude oil and said oil diluent so that the resulting mixture formed during step (d) has a predetermined viscosity equal to the design viscosity of the pipeline at the operating temperature of the pipeline and the flow rate of the mixture is substantially equal to the design capacity of the pipeline;
(l) computing means for generating a first output signal representative of said desired viscous crude oil flow rate and a second output signal representative of said desired oil diluent flow rate; and
(m) a first signal receiving means operatively connected to said computer means to which said first output signal is transmitted from said computer means and a second signal receiving means operatively connected to said computer means to which said second output signal is transmitted from said computer means, said first signal receiving means connected to said first flow-varying means for controlling the flow rate of said viscous crude oil to the desired value and said second signal receiving means connected to said second flow-varying means for controlling the flow rate of said oil diluent to the desired value.

6. A system for transporting viscous crude oil in a pipeline, comprising:
(a) a stream of viscous crude oil flowing in a first conduit;
(b) a stream of oil diluent flowing in a second conduit, said diluent having a relatively low predetermined relatively low viscosity and specific gravity;
(c) means for mixing the stream of viscous crude oil in the first conduit with the stream of oil diluent in the second conduit;
(d) means for introducing the resulting mixed streams of viscous crude oil and oil diluent from the mixing means into said pipeline for transportation to a point of use wherein the resultant flow rate in the pipeline is equal to the sum of the flow rate of said viscous crude oil in said first conduit and the flow rate of said oil diluent in said second conduit;
(e) a first flow-varying means operatively connected to said first conduit for controlling the rate of flow of said viscous crude oil through said first conduit;
(f) a second flow-varying means operatively connected to said second conduit for controlling the rate of flow of said oil diluent through said second conduit;
(g) viscosity sensing means operatively connected to said first conduit for developing a first signal representative of the viscosity of the viscous crude oil in said first conduit upstream of said first flow-varying means;
(h) specific gravity sensing means operatively connected to said first conduit for developing a second signal representative of the specific gravity of the viscous crude oil in said first conduit upstream of said first flow-varying means;
(i) means for developing a third signal representative of the viscosity of the diluent;
(j) means for developing a fourth signal representative of the specific gravity of the oil diluent;
(k) computer means responsive to said first, second, third and fourth signals which calculate the desired flow rate of said viscous crude oil and said oil diluent so that the resulting mixture formed during step (d) has a predetermined viscosity equal to the design viscosity of the pipeline at the operating temperature of the pipeline and the flow rate of the mixture is substantially equal to the design capacity of the pipeline;

(l) computing means for generating a first output signal representative of said desired viscous crude oil flow rate and a second output signal representative of said desired oil diluent flow rate; and (m) a first signal receiving means operatively connected to said computer means to which said first output signal is transmitted from said computer means and a second signal receiving means operatively connected to said computer means to which said second output signal is transmitted from said computer means, said first signal receiving means connected to said first flow-varying means for controlling the flow rate of said viscous crude oil to the desired value and said second signal receiving means connected to said second flow-varying means for controlling the flow rate of said oil diluent to the desired value.

* * * * *